(12) United States Patent
Pettersson

(10) Patent No.: US 8,844,896 B2
(45) Date of Patent: Sep. 30, 2014

(54) GIMBAL SYSTEM WITH LINEAR MOUNT

(75) Inventor: Daniel Pettersson, Eskilstuna (SE)

(73) Assignee: FLIR Systems, Inc., Wilsonville, OR (US)

(*) Notice: Subject to any disclaimer, the term of this patent is extended or adjusted under 35 U.S.C. 154(b) by 456 days.

(21) Appl. No.: 13/155,129

(22) Filed: Jun. 7, 2011

(65) Prior Publication Data

US 2012/0316685 A1   Dec. 13, 2012

(51) Int. Cl.
| | | |
|---|---|---|
| F16M 11/00 | (2006.01) | |
| F16F 3/00 | (2006.01) | |
| G03B 15/00 | (2006.01) | |
| G05B 15/02 | (2006.01) | |
| G08B 13/196 | (2006.01) | |
| G03B 17/56 | (2006.01) | |
| F16M 11/12 | (2006.01) | |
| F16M 11/20 | (2006.01) | |
| B64D 47/08 | (2006.01) | |
| H04N 5/232 | (2006.01) | |
| F16M 11/18 | (2006.01) | |

(52) U.S. Cl.
CPC .............. *F16F 3/00* (2013.01); *G03B 15/006* (2013.01); *G05B 15/02* (2013.01); *G08B 13/1963* (2013.01); *G03B 17/561* (2013.01); *F16M 11/126* (2013.01); *F16M 11/2014* (2013.01); *B64D 47/08* (2013.01); *H04N 5/23258* (2013.01); *F16M 11/18* (2013.01)
USPC .......................... 248/646; 248/637; 244/118.1

(58) Field of Classification Search
USPC ...................... 244/118.1; 248/637, 646, 125.7
See application file for complete search history.

(56) References Cited

U.S. PATENT DOCUMENTS

| | | | |
|---|---|---|---|
| 3,335,989 A | | 8/1967 | Bachman et al. |
| 4,609,168 A | * | 9/1986 | Dean et al. ................. 244/137.4 |
| 4,686,866 A | | 8/1987 | Rosheim |
| 4,860,974 A | * | 8/1989 | Barnett et al. ............. 244/173.3 |
| 5,123,621 A | | 6/1992 | Gates |
| 5,598,207 A | * | 1/1997 | Kormos et al. ............... 348/148 |
| 5,897,223 A | * | 4/1999 | Tritchew et al. ................ 396/13 |
| 5,904,318 A | | 5/1999 | Towfiq |
| 6,012,680 A | | 1/2000 | Edberg et al. |
| 6,154,317 A | | 11/2000 | Segerstrom et al. |
| 6,405,975 B1 | | 6/2002 | Sankrithi et al. |
| 6,512,509 B1 | | 1/2003 | McVicar |
| 7,264,220 B2 | * | 9/2007 | Dent et al. ..................... 248/660 |
| 2002/0145077 A1 | | 10/2002 | Shultz |
| 2003/0159535 A1 | | 8/2003 | Grover et al. |
| 2008/0164644 A1 | | 7/2008 | Ruebsamen et al. |
| 2009/0140845 A1 | | 6/2009 | Hioki |
| 2010/0032876 A1 | | 2/2010 | Hiley et al. |
| 2011/0052042 A1 | | 3/2011 | Tzvi |
| 2011/0133030 A1 | * | 6/2011 | Kennedy et al. ........... 244/118.5 |
| 2012/0104169 A1 | | 5/2012 | von Flotow et al. |
| 2012/0105634 A1 | | 5/2012 | Meidan et al. |

OTHER PUBLICATIONS

Young, Lee W., Authorized officer, International Searching Authority, International Search Report, PCT Application No. PCT/US2012/041327; search completion date: Jul. 24, 2012; search mailing date: Aug. 10, 2012.

Young, Lee W., Authorized officer, International Searching Authority, Written Opinion of the International Searching Authority, PCT Application No. PCT/US2012/041327; opinion completion date: Jul. 24, 2012; opinion mailing date: Aug. 10, 2012.

* cited by examiner

*Primary Examiner* — Timothy D Collins
*Assistant Examiner* — Jamie S Stehle
(74) *Attorney, Agent, or Firm* — Kolisch Hartwell, P.C.

(57) ABSTRACT

Gimbal system, including method and apparatus, for mounting a gimbal apparatus to a support platform with a mount assembly. The mount assembly may include first and second bar assemblies that are rotationally coupled to each other by a pair of gears.

18 Claims, 4 Drawing Sheets

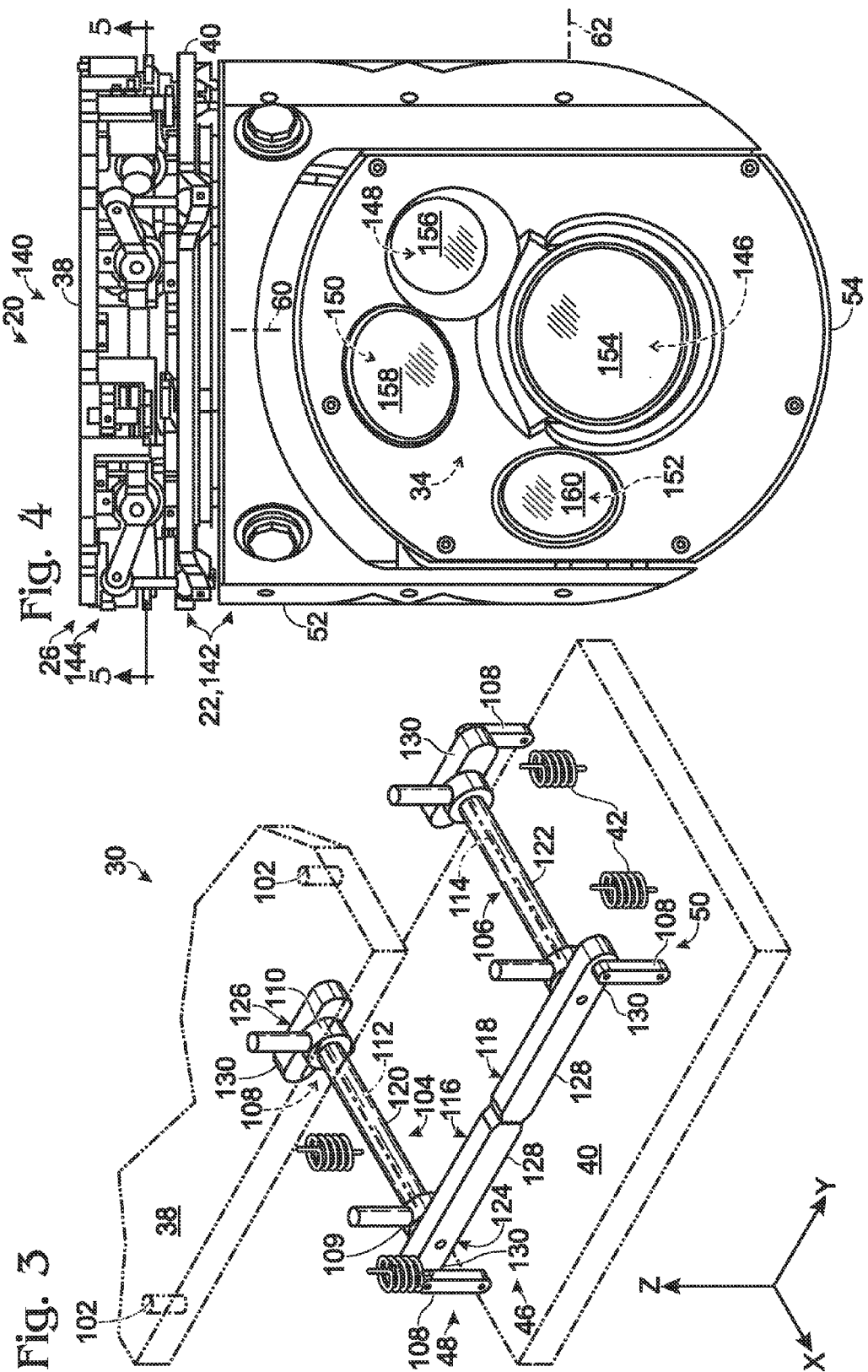

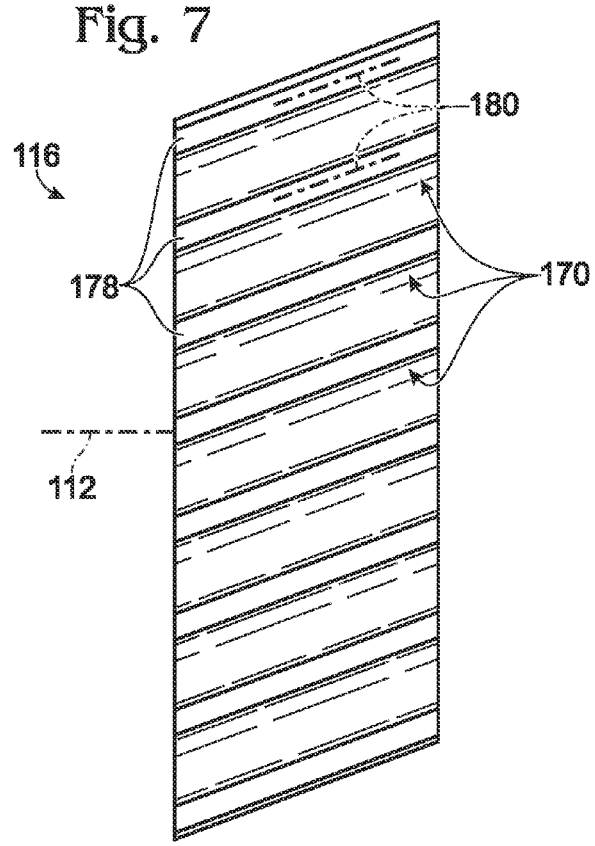
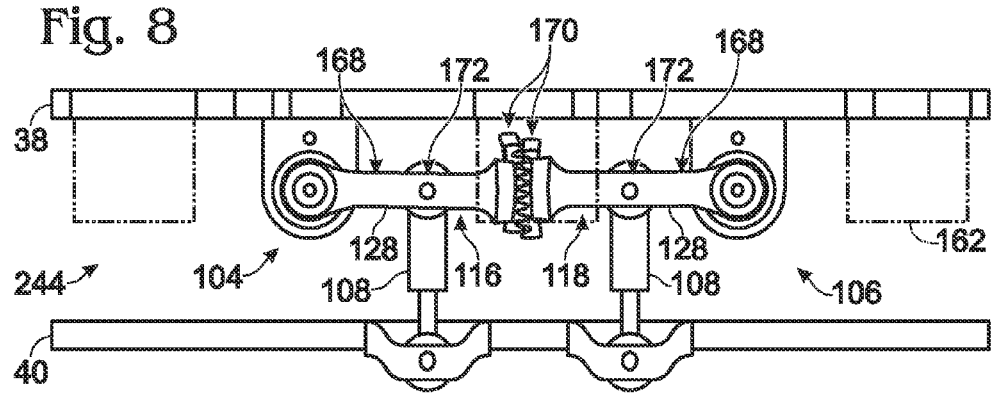

GIMBAL SYSTEM WITH LINEAR MOUNT

INTRODUCTION

An aircraft may be equipped with a gimbal system including a camera. The gimbal system enables the camera to be accurately pointed as the attitude and location of the aircraft changes during flight. Accordingly, the camera can be panned and tilted to survey a wide field of view or to monitor a specific target from the flying aircraft. The camera may provide a line of sight not available to the pilot and/or may detect optical radiation, such as infrared radiation, that is invisible to the human eye.

Aircraft vibration can degrade camera performance. Images from the camera can be unsteady and/or blurred if the field of view of the camera is not stabilized during flight. In particular, small, vibration-induced changes to the angular orientation of the camera, relative to the aircraft, can produce unacceptably large shifts in the field of view, even if the camera is being used to view a distant scene.

The gimbal system may stabilize the camera through servomechanisms that include gyroscopes and motors. The servomechanisms can sense small, vibration-induced changes to the camera's orientation and actively apply compensating forces or movements to stabilize the camera. However, such active compensation may need to be applied with great accuracy, high gain, and considerable speed, to effectively stabilize the image when aircraft vibration is transmitted to the camera. As a result, active compensation can require sophisticated instrumentation and substantial power consumption and generally is effective only for low vibration frequencies.

A mechanical approach to filtering vibrations for a gimbal-oriented camera is disclosed in U.S. Pat. No. 6,154,317 to Segerstrom et al., which is incorporated herein by reference. Segerstrom provides a stand that includes an upper frame disposed above a lower frame, with the upper frame attached to a vehicle and the lower frame to a set of gimbals supporting a camera below the lower frame. The frames are connected by a set of springs and a coupling assembly. The coupling assembly permits the frames to move relative to each other along a vertical axis as the springs are compressed and stretched, while maintaining the frames substantially parallel to each other. However, the mechanical configuration of the coupling assembly imparts a systematic rotation to the lower frame about a horizontal axis as the separation between the frames changes. The systematic rotation is relatively small, but may be significant enough to produce a corresponding, undesirable angular change in the line of sight of the camera, which impacts image quality.

A more effective mounting system is needed to improve the mechanical stabilization of a gimbal-oriented camera.

SUMMARY

The present disclosure provides a gimbal system, including method and apparatus, for mounting a gimbal apparatus to a support platform with a mount assembly. The mount assembly may include first and second bar assemblies that are rotationally coupled to each other by a pair of gears.

BRIEF DESCRIPTION OF THE DRAWINGS

FIG. 3 is a schematic view of selected aspects of a stand that includes the linear mount of FIG. 2, with spring elements and a coupling assembly of the linear mount exploded from upper and lower frames of the stand.

FIG. 4 is a side view of an exemplary embodiment of an imaging unit for the gimbal system of FIG. 1, with the unit including an exemplary linear mount attached to a gimbal apparatus, in accordance with aspects of present disclosure.

FIG. 7 is an end view of a gear of the linear mount of FIG. 4, taken generally along line 7-7 of FIG. 6.

FIG. 8 is a view of selected aspects of another exemplary embodiment of a linear mount attached to a gimbal apparatus, in accordance with aspects of present disclosure.

DETAILED DESCRIPTION

Figure 1:
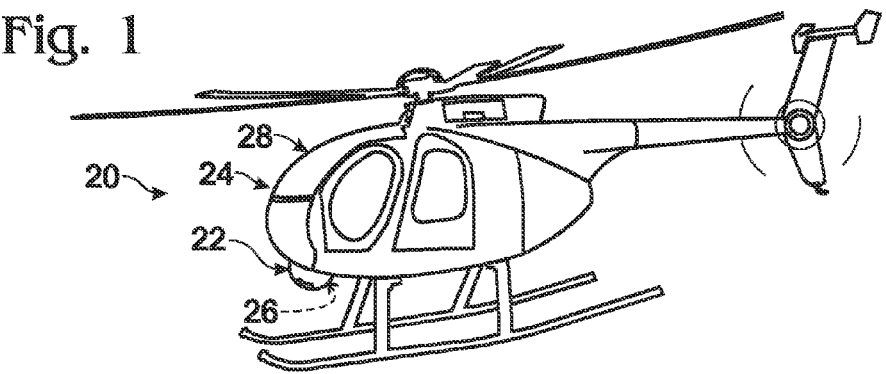
FIG. 1 is a view of an exemplary gimbal system including a gimbal apparatus attached to an exterior of a support platform (namely, a helicopter) via a linear mount, in accordance with aspects of the present disclosure.

The present disclosure provides a gimbal system, including method and apparatus, for mounting a gimbal apparatus to a support platform with a mount assembly. The mount assembly may include first and second bar assemblies that are rotationally coupled to each other by a pair of gears.

A gimbal system is provided. The system may comprise a gimbal apparatus including a first frame and a plurality of gimbals (e.g., two or more) supporting a payload that is orientable with respect to the first frame about a plurality of axes by motor-driven rotation of the gimbals. The system also may comprise a mount assembly, which may be termed a linear mount. The linear mount may include a second frame and first and second bar assemblies. The bar assemblies may be pivotably connected to the second frame for rotation about a pair of spaced axes and rotationally coupled to each other by a pair of gears. The linear mount also may include a plurality of linkage members connecting the bar assemblies to the first frame, such that coupled rotation of the first and second bar assemblies produces motion of the gimbal apparatus along an axis.

Another gimbal system is provided. The system may comprise a gimbal apparatus including a first frame, a plurality of gimbals, and a payload orientable with respect to the first frame about a plurality of orthogonal axes by processor-controlled, motor-driven rotation of the gimbals. The system also may comprise a mount assembly (a linear mount) including a second frame configured to be attached to a support platform and first and second bar assemblies supported by and pivotably connected to the second frame for rotation about respective axes and rotationally coupled to each other by a pair of meshed gears. The linear mount also may include a plurality of linkage members connecting opposing end regions of each of the bar assemblies to the first frame, such that coupled rotation of the first and second bar assemblies produces motion of the gimbal apparatus along an axis extending orthogonally through the second frame. The linear mount further may comprise a plurality of spring elements disposed between the first and second frames and configured to resiliently position the gimbal apparatus along the axis.

Yet another gimbal system is provided. The system may comprise a gimbal apparatus including a first frame, a plurality of gimbals, and a payload orientable with respect to the first frame about a plurality of orthogonal axes by processor-controlled, motor-driven rotation of the gimbals. The system also may comprise a mount assembly (a linear mount) including a second frame configured to be attached to a support platform, and first and second bar assemblies pivotably connected to the second frame. Each bar assembly may include a shaft and an arm extending transversely from the shaft. The shafts may be rotationally coupled to each by toothed engagement of the arms with each other. The linear mount also may include a plurality of linkage members connecting the bar assemblies to the first frame, such that coupled rotation of the shafts produces motion of the gimbal apparatus along an axis. The linear mount further may include a plurality of spring elements configured to resiliently position the gimbal apparatus along the axis.

A method of using the gimbal system is provided. In the method, the second frame of the mount assembly may be secured to a vehicle. The payload may be oriented by rotation of the gimbals as the vehicle conveys the gimbal apparatus.

The use a linear mount with gear-coupled bar assemblies to mount a gimbal apparatus provides substantial advantages. These advantages may include less vibration-induced rotation of the gimbal apparatus, better image quality, a more compact linear mount having a lower building height, or a combination thereof, among others.

Further aspects of the present disclosure are described in the following sections: (I) definitions, (II) overview of an exemplary gimbal system with a linear mount, (III) payload, (IV) support platform, and (V) examples.

I. DEFINITIONS

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet Radiation—

Invisible electromagnetic radiation having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible Light—

Visible electromagnetic radiation having wavelengths from about 360 or 400 nanometers, just longer than ultraviolet radiation, to about 760 or 800 nanometers, just shorter than infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) Radiation—

Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared range having wavelengths between about 3,000 and 5,000 nm (i.e., 3 and 5 μm) and between about 7,000 or 8,000 and 14,000 nm (i.e., 7 or 8 and 14 μm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm), (B) short-wave infrared (SWIR) (from about 1,000 nm to about 3,000 nm), (C) mid-wave infrared (MWIR) (from about 3,000 nm to about 6,000 nm), (D) long-wave infrared (LWIR) (from about 6,000 nm to about 15,000 nm), and (E) very long-wave infrared (VLWIR) (from about 15,000 nm to about 1 mm). Portions of the infrared range, particularly portions in the far or thermal IR having wavelengths between about 0.1 and 1 mm, alternatively or additionally may be termed millimeter-wave (MMV) wavelengths.

II. OVERVIEW OF AN EXEMPLARY GIMBAL SYSTEM WITH A LINEAR MOUNT

FIG. 1 shows an exemplary gimbal system 20 including a gimbal apparatus 22 attached to the exterior of a support platform 24 via a linear mount 26. In the present illustration, support platform 24 is a vehicle 28, namely, a helicopter.

The linear mount may permit motion of the gimbal apparatus with respect to the support platform by producing predominantly translational motion of the gimbal apparatus along an axis when energy from vehicle vibration is transmitted to the gimbal apparatus. Also, the linear mount may serve as a mechanical filter to reduce transmission of vibration to the gimbal apparatus.

Figure 2:
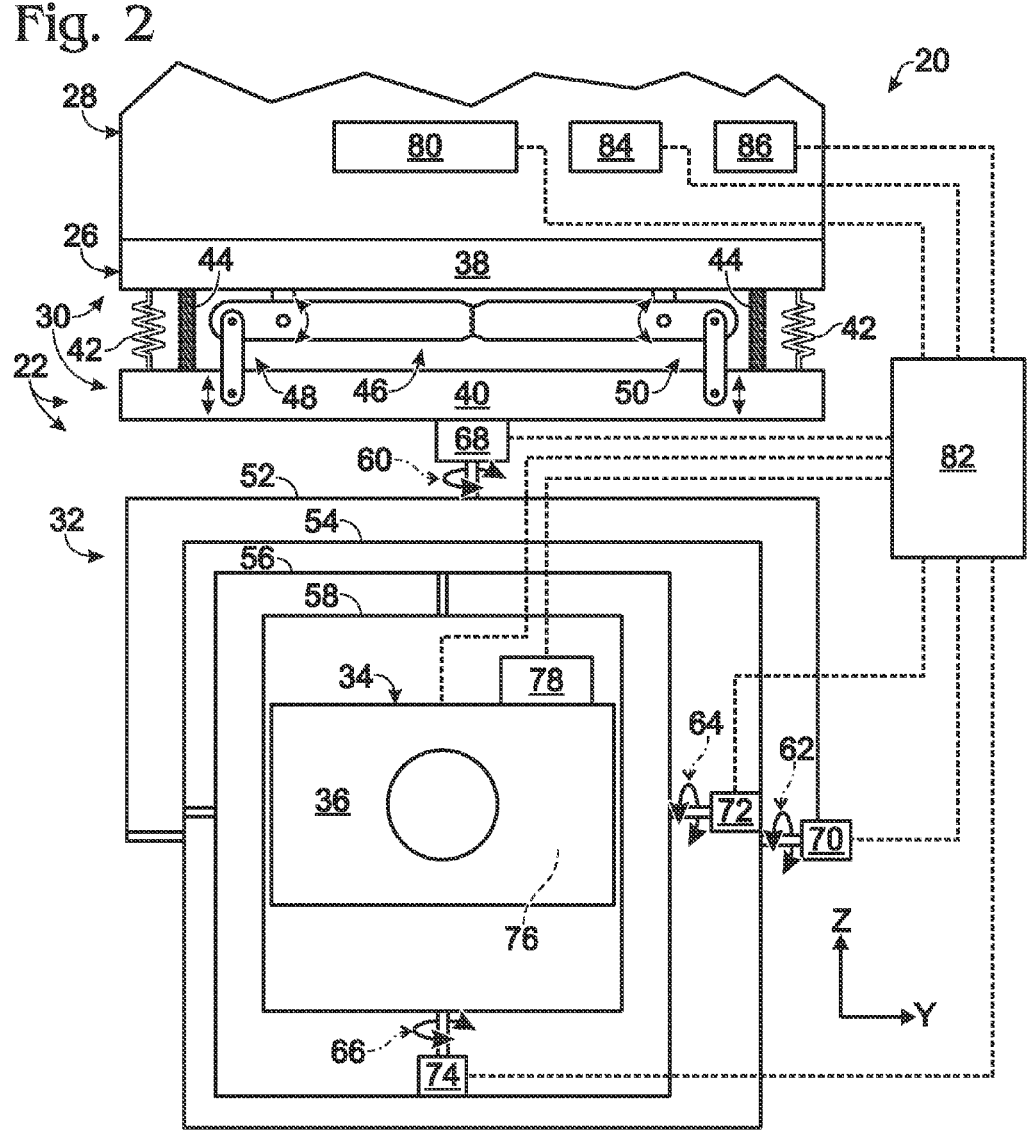
FIG. 2 is a schematic view of selected aspects of the gimbal system of FIG. 1, including the linear mount and the gimbal apparatus, in accordance with aspects of the present disclosure.

FIG. 2 shows a schematic view of selected aspects of gimbal system 20. The system may include a frame assembly or stand 30 that mounts a gimbal assembly 32 to vehicle 28. The gimbal assembly is supported by the stand (e.g., below or above the stand, among others) and pivotable collectively with respect to the stand (and the vehicle). The stand is relatively stationary with respect to vehicle 28, and the gimbal assembly is relatively movable with respect to the vehicle. System 20 also is equipped with a payload 34 (e.g., including at least one or more optical devices, such as one camera 36) that is orientable with respect to stand 30 (and the vehicle) by rotation of gimbals of gimbal assembly 32 about a plurality of axes (e.g., a plurality of orthogonal axes).

Stand 30 may include first and second frames 38, 40. The frames are described herein as an upper frame 38 and a lower frame 40 arranged along a vertical axis (parallel to the indicated Z-axis), to simplify the presentation. However the frames may switch their relative positions if the gimbal apparatus is mounted above the vehicle. More generally, the frames may have any relative arrangement along any axis based, for example, on how the stand is mounted to a support platform. In any event, upper frame 38 may secure the stand to vehicle 28, and lower frame 40 may connect the stand (and upper frame 38) to gimbal assembly 32. The upper frame constitutes part of linear mount 26, while the lower frame forms part of gimbal apparatus 22 (e.g., with gimbal assembly 32 and payload 34, among others).

Frames 38, 40 may be connected movably to each other by one or more spring elements 42, one or more dampers 44, a coupling assembly 46, or any combination thereof. Spring elements 42 cushion gimbal apparatus 22 from shocks and limit transmission of vibration from the vehicle to the gimbal apparatus. Dampers 44 dissipate kinetic energy as heat.

Coupling assembly 46 may include a pair of cam assemblies 48, 50 that are in meshed engagement with each other via a pair of gears. The cam assemblies function in concert to limit the degrees of freedom of lower frame 40. In particular, the coupling assembly permits translational motion of the lower frame, such as translational motion along the vertical axis, to change the separation distance between the upper and lower frames. In some cases, the coupling assembly permits some translational motion in any direction. However, the coupling assembly generally blocks rotational motion of the lower frame about any horizontal axis (e.g., the X-axis and the Y-axis). As a result, the lower frame and the upper frame, and respective planes defined by the frames, may be held parallel to one another by the coupling assembly. Some rotation of lower frame 40 about the vertical axis (e.g., less than about 5, 2, or 1 degrees) may (or may not) be permitted.

Gimbal assembly 32 may comprise a sequence of two or more gimbals, such as first through fourth gimbals 52-58. Each gimbal is pivotably connected to preceding and succeeding gimbals of the sequence, for example, via one or more axles. First gimbal 52 supports second through fourth gimbals 54-58 and payload 34 and is pivotably connected to and supported by lower frame 40 for rotation about a first axis 60 (e.g., a first yaw, azimuthal, and/or vertical axis), which may extend at least generally centrally through stand 30 and/or one or both frames 38, 40. Second gimbal 54 supports third and fourth gimbals 56, 58 and payload 34 and is pivotably connected to and supported by first gimbal 52 for rotation about a second axis 62 (e.g., a first pitch, elevational, and/or horizontal axis), which may be orthogonal to first axis 60. Third gimbal 56 supports fourth gimbal 58 and payload 34 and is pivotably connected to and supported by second gimbal 54 for rotation about a third axis 64 (e.g., a second pitch, elevational, and/or horizontal axis). Third axis 64 may be parallel to, and/or or coaxial with second axis 62 (or first axis 60 with the gimbal assembly in a neutral position). Fourth gimbal 58 supports payload 34 and is pivotably connected to and supported by third gimbal 56 for rotation about a fourth axis 66 (e.g., a second yaw, azimuthal, and/or vertical axis). Fourth axis 66 may be parallel to, and/or coaxial with first axis 60 (or second axis 62) with the gimbal assembly in a neutral position. The payload may (or may not) be fixed to the fourth gimbal. In some cases, rotation of first and second gimbals 52 and 54 may provide larger adjustments to the orientation of payload 34, and rotation of third and fourth gimbals 58 and 60 may provide smaller adjustments to the orientation (or vice versa).

Rotation of each gimbal 52-58 may be driven by a corresponding motor 68-74. Each motor may be attached to its corresponding gimbal or to the structure that supports the gimbal, or a combination thereof. For example, motor 68 may be attached to lower frame 40 or first gimbal 52; motor 70 to first gimbal 52 or second gimbal 54; and so on. Accordingly, the angular orientation of the payload may be adjusted horizontally and vertically via rotation of gimbals 52-58, without changing the orientation of the support platform, and/or the payload may continue to point at a target as the attitude and location of the support platform changes, among others. Accordingly, the gimbal system may allow one or more fixed and/or moving targets to be monitored or tracked over time from a fixed and/or moving support platform.

The gimbal system also may comprise one or more sensors to sense aspects of the vehicle, one or more gimbals, the payload, or a target. Exemplary sensors include an orientation sensor (e.g., a gyroscope that measures angular position or rate of angular change, among others), an accelerometer, an optical sensor to detect optical radiation (e.g., an image sensor 76 in camera 36), or the like. At least one gimbal of the gimbal assembly and/or the payload may be attached to at least one gyroscope 78 to measure the orientation of the gimbal and/or payload. In some cases, the gimbal system may include at least one inertial measurement unit (IMU) 80, which may be carried by gimbal apparatus 22 (e.g., by payload 34 or fourth gimbal 58), and/or vehicle 28. The IMU includes sensors to measure acceleration along three orthogonal axes and angular position/change about three orthogonal axes. Measurements from unit 80 alone or in combination with those from one or more other gyroscopes of the gimbal apparatus may be used to aim the payload with respect to an inertial reference frame (e.g., the earth), as the vehicle travels with respect to the reference frame.

Gimbal system 20 also may comprise a processor 82 and a user control unit 84 to communicate user preferences, commands, etc., to the processor. The processor may be included in gimbal apparatus 22 (and/or stand 30), vehicle 28, or a combination thereof, among others. The user control unit may be disposed in the vehicle, if the vehicle has a person onboard, or may be disposed elsewhere (e.g., on the ground) if the vehicle is unmanned.

The processor may include any electronic device or set of electronic devices responsible for signal processing, manipulation of data, and/or communication between or among gimbal system components. The processor may be localized to one site or may be distributed to two or more spaced sites of the gimbal system. The processor may be programmed to receive user inputs from user control unit 84 and to control operation of or receive signals from any suitable system components, as indicated by dashed lines in FIG. 2, for example, the motors, sensors (e.g., one or more optical devices, an IMU(s), gyroscopes, accelerometers, etc.), payload 34, a display 86 carried by vehicle 28, and so on. Accordingly, the processor may be in communication with the motors, sensors, and display, to receive signals from and/or send signals to these devices, and may be capable of controlling and/or responding to operation of these devices. Also, the processor may be responsible for manipulating (processing) image data (i.e., a representative video signal) received from camera 36 before the signal is communicated to display 86, to drive formation of visible light images by the display.

Gimbal apparatus 22 may include and/or be connected to a power supply. The power supply may include any mechanism for supplying power, such as electrical power, to the motors, sensors, camera, processor, etc. The power supply may be provided by the support platform, the stand, the gimbal apparatus, or a combination thereof, among others. Suitable power supplies may generate, condition, and/or deliver power, including AC and/or DC power, in continuous and/or pulsed modes. Exemplary power supplies may include batteries, AC-to-DC converters, DC-to-AC converters, and so on.

FIG. 3 shows stand 30 in an exploded configuration, with spring elements 42 and coupling assembly 46 spaced from upper frame 38 and lower frame 40. Dampers 44 (see FIG. 2) are not shown here, to simplify the presentation.

Upper frame 38 may be secured to a support platform via attachment features of the upper frame. For example, the upper frame may define a set of apertures 102 to receive fasteners. The apertures may have any suitable position, such as being disposed generally centrally or near a perimeter of the upper frame.

The upper frame may support coupling assembly 46, with the coupling assembly disposed at least generally between the upper and lower frames. Each cam assembly 48, 50 of the coupling assembly may include a respective bar assembly 104, 106 and one or more linkage members 108 that connect the bar assembly to lower frame 40.

Each bar assembly may be pivotably connected to the upper frame at one or more positions. For example, each bar assembly may be pivotably connected to the upper frame at a pair of positions along the bar assembly (e.g., positions 109, 110 for bar assembly 104), to define respective rotation axes 112, 114 for rotation of the bar assemblies. The rotation axes are spaced from each other and may be coplanar and/or parallel.

The bar assemblies may provide at least one pair of gears 116, 118. The gears are meshed with each other via teeth that provide toothed engagement of the gears with each other. As result, rotation of one of the bar assemblies through an angle is matched by rotation of the other bar assembly in the opposite direction through the same angle. A pair of gears may be disposed at either or both paired end regions of the bar assemblies.

Each bar assembly 104, 106 may be equipped with a shaft 120 or 122 and a pair of transverse members or heads 124, 126, which may be fixed to respective opposing end regions of the shaft. The opposing heads of each bar assembly may have similar or identical structure (e.g., see Example 1) or may be structured differently from each other, as shown here.

Each bar assembly 104, 106 and/or each opposing end region of the bar assembly may include at least one arm that projects transversely and/or at least generally radially from shaft 120 or 122 (or from corresponding rotation axis 112 or 114). For example, in the depicted embodiment, a front end region or front head 124 of each bar assembly provides a first or longer arm 128 and a second or shorter arm 130. Also, a back end region or back head 126 of each bar assembly provides only second arm 130. In other examples, arms 128 and 130 may have about the same length or arm 130 may be longer than arm 128. In any event, first arms 128 may be included in gears 116, 118 and may provide teeth for meshed engagement of the gears. In contrast, second arms 130 may provide respective attachment sites for linkage members 108. In other examples, first arms 128 may provide attachment sites for linkage members 108 (e.g., see Example 2).

Spring elements 42 may be disposed in any suitable number of positions between frames 38, 40. For example, stand 30 may include at least three spring elements, at least one spring element for each linkage member (e.g., at least four spring elements), or the like. In any event, the spring elements may be configured to resiliently position lower frame 40 (and gimbal apparatus 22) along an axis (e.g., a vertical axis) that is orthogonal to a plane defined by the upper or lower frame.

III. PAYLOAD

A payload is any device or collection of devices that is carried and aimed by a gimbal assembly. The payload may include one or more detectors and/or emitters, among others. A detector may create a signal representative of detected electromagnetic radiation, an electric field, a magnetic field, a pressure or pressure difference (e.g., sonic energy), a temperature or temperature difference (e.g., thermal energy), a particle or particles (e.g., high energy particles), movement (e.g., an inertial measurement device), and/or the like. An emitter generally comprises any mechanism for emitting a suitable or desired signal, such as electromagnetic radiation (e.g., via a laser), sonic energy, and/or the like. The payload generally is in communication with a processor that sends signals to and/or receives signals from the payload. The payload may be coupled (generally via a processor) to a display such that signals from the payload may be formatted into a visual form for viewing on the display. The present disclosure may be especially useful when the payload contains high heat-emitting components, such as lasers, radars, millimeter-wave (MMW) imagers, light detection and ranging (LIDAR) imagers, mine-detection sensors, and/or inertial measurement units (IMUs).

In some embodiments, the payload may form a detection portion of an imaging system. An imaging system generally comprises any device or assembly of devices configured to generate an image, or an image signal, based on received energy, such as electromagnetic radiation. Generally, an imaging system detects spatially distributed imaging energy (e.g., visible light and/or infrared radiation, among others) and converts it to a representative signal. Imaging may involve optically forming a duplicate, counterpart, and/or other representative reproduction of an object or scene, especially using a mirror and/or lens. Detecting may involve recording such a duplicate, counterpart, and/or other representative reproduction, in analog or digital formats, especially using film and/or digital recording mechanisms. Accordingly, an imaging system may include an analog camera that receives radiation (e.g., optical radiation) and exposes film based on the received radiation, thus producing an image on the film. Alternatively, or in addition, an imaging system may include a digital camera that receives radiation (e.g., optical radiation) and generates a digital image signal that includes information that can be used to generate an image that visually portrays the received radiation. Alternatively, or in addition, an imaging system may include an active component such as a laser to illuminate a scene and form an image from one or more reflections of the laser. "Imaging energy," as used herein, may include any type of energy, particularly electromagnetic energy, from which an image can be generated, including but not limited to ultraviolet radiation, visible light, and infrared radiation.

Suitable detectors for an imaging system may include (1) array detectors, such as charge-coupled devices (CODs), charge-injection devices (CIDs), complementary metal-oxide semiconductor (CMOS) arrays, photodiode arrays, microbolometers, and the like, and/or (2) arrays of point detectors, such as photomultiplier tubes (PMTs), photodiodes, pin photodiodes, avalanche photodiodes, photocells, phototubes, and the like. Detectors may be sensitive to the intensity, wavelength, polarization, and/or coherence of the detected imaging energy, among other properties, as well as spatial and/or temporal variations thereof.

The imaging system also may include optics (i.e., one or more optical elements). Exemplary optical elements may include (1) reflective elements (such as mirrors), (2) refractive elements (such as lenses), (3) transmissive or conductive elements (such as fiber optics or light guides), (4) diffractive elements (such as gratings), and/or (5) subtractive elements (such as filters), among others.

The imaging system also may contain gyroscopes and/or other elements arranged to form an inertial measurement unit (IMU) on an optical bench. The IMU may be used to assess the pointing angle of the line-of-sight, as well as geo-location, geo-referencing, geo-pointing, and/or geo-tracking in earth coordinates.

In some embodiments, the imaging system may be capable of generating image signals based on reflection from a self-contained laser and/or other light or radiation source. The generated image may or may not contain range information. Such imagers may generate large amounts of heat. The present disclosure may enable the use and incorporation of light detection and ranging (LIDAR) systems, such as 3-D LIDAR systems, into gimbal systems in which the large amounts of associated heat would otherwise prevent their use.

In some embodiments, an imaging system may be capable of generating image signals based on two or more different types or wavebands of imaging energy. For example, the imaging system may be configured to generate a first image signal representative of visible light and a second image signal representative of infrared radiation. Visible light and infrared radiation are both types of electromagnetic radiation (see Definitions); however, they are characterized by different wavebands of electromagnetic radiation that may contain or reflect different information that may be used for different purposes. For example, visible light may be used to generate an image signal that in turn may be used to create a photograph or movie showing how a scene appears to a human observer. In contrast, infrared radiation may be used to generate an image signal that in turn may be used to create a heat profile showing heat intensity information for a scene. More generally, the imaging system may be used with any suitable set of first and second (or first, second, and third (and so on)) image signals, using any suitable wavelength bands. These suitable image signals may include first and second visible wavebands, first and second infrared wavebands, mixtures of visible, infrared, and/or ultraviolet wavebands, and so on, depending on the application.

In some examples, an imaging system may form composite images. The composite images may be straight combinations of two or more other images. However, in some cases, one or both of the images may be processed prior to or during the process of combining the images. Composite images may be formed for use in firefighting, aeronautics, surveillance, and/or the like, for example, by superimposing infrared images of hot spots, runway lights, persons, and/or the like on visible images.

The payload alternatively, or in addition, may include non-imaging systems, such as laser rangefinders, laser designators, laser communication devices, polarimeters, hyperspectral sensors, and/or the like.

IV. SUPPORT PLATFORM

The gimbal system of the present disclosure may include a gimbal apparatus connected to a support platform by a linear mount. A support platform, as used herein, generally refers to any mechanism for supporting and/or conveying a linear mount and a gimbal apparatus. The support platform may be movable or fixed in relation to the earth, and may be disposed on the ground, in the air or space, or on and/or in water, among others. In any case, the support platform may be selected to complement the function of the gimbal apparatus and particularly its payload.

The support platform may be movable, such as a vehicle with or without motive power. Exemplary vehicles include a ground vehicle (e.g., a car, truck, motorcycle, tank, etc.), a watercraft (e.g., a boat, submarine, carrier, etc.), an aircraft (e.g., a fixed-wing piloted aircraft, pilotless remote-controlled aircraft, helicopter, missile, dirigible, aerostat balloon, rocket, etc.), or the like.

The support platform may be fixed in position. Exemplary fixed support platforms may include a building, an observation tower, a wall, and/or an observation platform, among others.

A gimbal system with a movable or fixed support platform may be used for any suitable application(s). Exemplary applications for a gimbal system include navigation, targeting, search and rescue, law enforcement, firefighting, force protection, and/or surveillance, among others.

V. EXAMPLES

The following examples describe selected aspects of exemplary gimbal systems. These examples are intended for illustration and should not be interpreted as limiting the entire scope of the present disclosure.

Example 1

Exemplary Imaging Unit with a Gear-Coupled Linear Mount

This example describes an exemplary imaging unit 140 that may form at least part of gimbal system 20 and including an exemplary embodiment 142 of gimbal apparatus 22 attached to an exemplary embodiment 144 of linear mount 26; see FIGS. 4-7. Other structural elements and features of unit 140 described previously with respect to FIGS. 2 and 3 generally have been assigned the same reference numbers as in FIGS. 2 and 3.

Second gimbal 54 supports and encloses payload 34. The payload may include a plurality of optical devices, such as an infrared camera 146, a video camera for visible light (e.g., a closed-circuit television camera) 148, a laser rangefinder 150, a light source that serves as a pointer and/or illuminator 152, or any combination thereof. The second gimbal also may be equipped with one or more optical windows 154-160 that allow optical radiation to enter or exit the second gimbal, such that the optical radiation can travel to and/or from each optical device of the payload.

Figure 5:
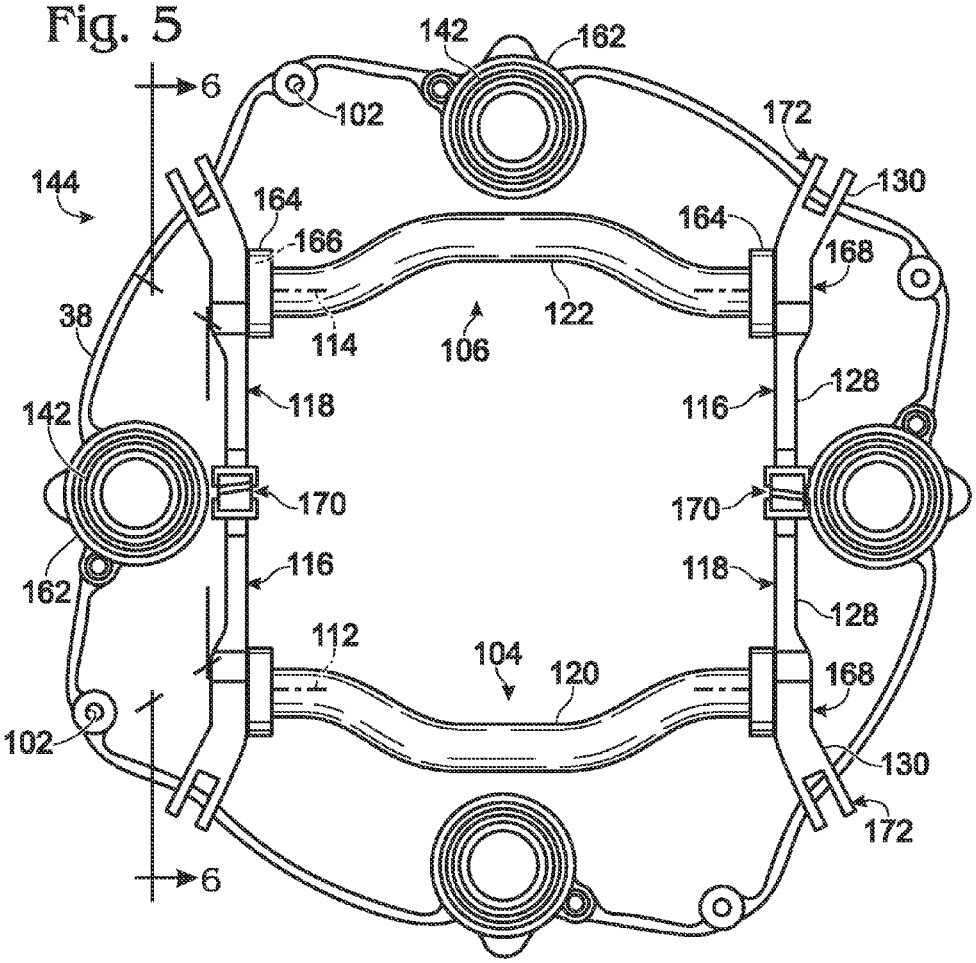
FIG. 5 is a bottom view of selected aspects of the linear mount of FIG. 4, taken generally along line 5-5 of FIG. 4.

FIG. 5 shows a bottom view of selected aspects of linear mount 144. Each spring element 42 may be disposed in a spring housing 162 formed by the upper frame and depending from the body thereof. The housing may, for example, for cylindrical. The spring element may be formed of any suitable material, such as metal (e.g., a coil spring or leaf spring), an elastomer, or a combination thereof, among others. In some cases, the spring element may have a central or compression axis oriented orthogonally to a plane defined by upper frame 38. The spring elements may be disposed at least generally inside or outside bar assemblies 104, 106 considered collectively. For example, in the depicted embodiment, a pair of spring elements opposingly flanks the opposing sides (i.e., shafts 120, 122) of the bar assemblies and another pair of spring elements opposingly flanks the opposing ends of the bar assemblies. The spring elements may permit relative translational motion of frames 38, 40 along three orthogonal axes, and, optionally, preferentially along an orthogonal axis extending through the frames.

Each bar assembly 104, 106 may be supported by, and may extend through, a pair of brackets 164 depending from upper frame 38. Each bracket may hold a bearing 166 that facilitates rotation of the bar assembly by reducing friction.

A transverse member 168 may be secured to each opposing end region of a shaft 120 or 122, such that the pair of transverse members and the shaft pivot collectively as a unit. The transverse member may project transversely with respect to the shaft, in one or more directions, to form a gear 116 or 118 including a series of teeth 170 and also to form at least one attachment site 172 for a linkage member 108 (see below). In the depicted embodiment, two pairs of gears 116, 118 are formed by two pairs of transverse members 168.

The transverse member may have any suitable shape. For example, the transverse member may be linear or may be bent, as shown here. In some cases, the transverse member may form arms 128, 130 that extend obliquely relative to each other from a rotation axis of the bar assembly. In the present illustration, arm 128 extends orthogonally from the rotation axis, and arm 130 extends obliquely to the rotation axis and obliquely to the long axis of arm 128. Arm 130 may be bifurcated to form a receiver for an end of linkage member 108.

Shafts 120, 122 may have any suitable shape. The shaft may be straight or may be bent at one or more positions. For example, a central region along the shaft may be laterally offset from a rotation axis of the shaft. The use of a shaft with an offset central region may provide more space between the shafts for accommodating other components of the gimbal apparatus.

Figure 6:
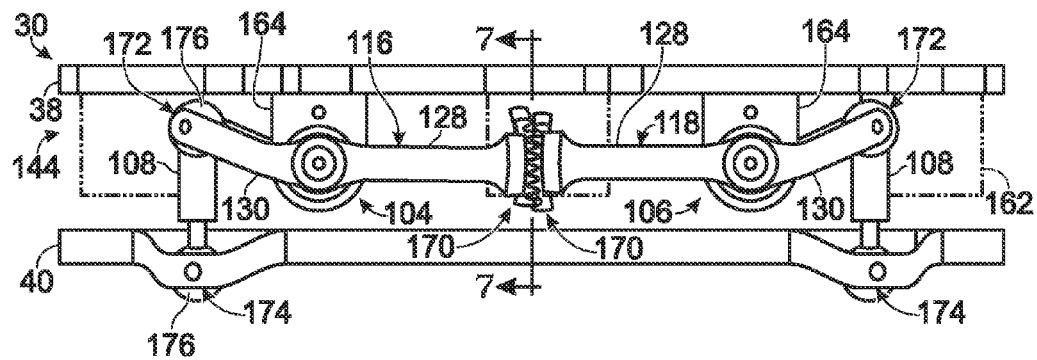
FIG. 6 is a side view of selected aspects of the linear mount and gimbal apparatus of FIG. 4, taken generally along line 6-6 of FIG. 5.

FIG. 6 shows a side view of linear mount 144 attached to lower frame 40, with each spring housing 162 shown in phantom outline to simplify the presentation. A respective linkage member 108 extends from attachment site 172 of each arm 130 to an attachment site 174 of lower frame 40. Each end of linkage member 108 provides a joint 176 (e.g., a spherical joint) that permits pivotal motion about orthogonal axes. The length of each linkage member is fixed, but its angular disposition is adjustable via joints 176, to permit translational motion of the lower frame in any direction while keeping the frames parallel to each other. Furthermore, coupled rotation of bar assemblies 104, 106 via gears 116, 118 maintains all four of the attachment sites 172 of arms 130 in a coplanar arrangement and equidistant from upper frame 38 (and/or a plane defined by the upper frame). As a result, the coupled rotation drives translational motion of the lower frame (and gimbal apparatus), which may be linear motion along an axis that is orthogonal to the rotation axes of the bar assemblies.

Teeth 170 formed at the end of each gear 116, 118 may be arranged along an arcuate path having a radius corresponding to the distance from the rotation axis of the gear (or bar assembly) to the teeth. The arcuate path may extend along any suitable portion of an imaginary, complete circle of the same radius centered on the rotation axis, such as less than about 60, 45, or 30 degrees, among others. The sets of teeth formed by meshed gears 116, 118 are complementary to each other and interdigitated with each other.

FIG. 7 shows an end view of gear 116, particularly teeth 170 thereof. Each gear may be a helical gear. Accordingly, a crest or land 178 of each tooth may define a tooth axis 180 that extends obliquely to rotation axis 112 of the gear. The crest also may extend along a segment of a helical path. The teeth of corresponding meshed gear 118 (e.g., see FIG. 6) have crests that extend substantially parallel to the teeth of gear 116 to permit interdigitation of the respective sets of teeth. Coupled rotation of the first pair of meshed helical gears 116, 118 creates a force directed parallel to rotation axes 112, 114. The force can be balanced by an equal but opposite force created by the second pair of meshed helical gears 116, 118, if the positions of the gears are swapped in the second pair. Stated differently, the second pair of gears may be related to the first pair by rotation through a half turn about a vertical axis. In other embodiments, the gears may be spur gears, among others. However, the use of helical gears may, in some cases, provide smoother operation of the gears with less backlash.

Example 2

Alternative Linkage for a Gear-Coupled Linear Mount

This example describes an alternative linkage for a linear mount 244; see FIG. 8.

Mount 244 may be structured and may operate generally as described for linear mount 144 (e.g., see FIGS. 5-7). However, bar assemblies 104, 106 of mount 244 incorporate shorter transverse members 168. The transverse members form gears 116, 118 and a pair of longer arms 128, but not shorter arms 130 for attachment of linkage members 108 (e.g., see FIGS. 5 and 6). Instead, arms 128 form respective attachment sites 172 for linkage members 108. Each site 172 is disposed intermediate the rotation axis and teeth 170 of the corresponding arm 128.

Example 3

Selected Embodiments

This example describes selected embodiments of the present disclosure as a series of numbered paragraphs.

1. A gimbal system, comprising: (A) a gimbal apparatus including a first frame and a plurality of gimbals supporting a payload that is orientable with respect to the first frame about a plurality of axes by motor-driven rotation of the gimbals; and (B) a mount assembly including a second frame, first and second bar assemblies pivotably connected to the second frame for rotation about a pair of spaced axes and rotationally coupled to each other by a pair of gears, and a plurality of linkage members connecting the bar assemblies to the first frame, such that coupled rotation of the first and second bar assemblies produces motion of the gimbal apparatus along an axis.

2. The gimbal system of paragraph 1, wherein the second frame defines a plane, and wherein the motion of the gimbal apparatus is at least substantially orthogonal to the plane.

3. The gimbal system of paragraph 2, wherein the second frame includes a plate forming a body of the second frame, and wherein the plate defines the plane.

4. The gimbal system of any of paragraphs 1 to 3, wherein a different pair of the linkage members is pivotably connected to respective opposing end regions of each bar assembly and pivotably connected to the first frame of the gimbal apparatus.

5. The gimbal system of any of paragraphs 1 to 4, wherein the first and second bar assemblies are rotationally coupled to each other by meshed engagement of a first pair of gears and meshed engagement of a second pair of gears.

6. The gimbal system of paragraph 5, wherein each bar assembly includes a first transverse member and a second transverse member, wherein the first pair of gears is formed collectively by the first transverse members of the bar assemblies, and wherein the second pair of gears is formed collectively by the second transverse members of the bar assemblies.

7. The gimbal system of any of paragraphs 1 to 4, wherein the first and second bar assemblies are rotationally coupled to each other by meshed engagement of only one pair of gears.

8. The gimbal system of any of paragraphs 1 to 7, wherein each gear is elongate orthogonal to an axis of rotation of such gear and includes a series of teeth arranged along an arcuate path that represents less than 45 degrees of a complete circle.

9. The gimbal system of any of paragraphs 1 to 8, wherein each gear is a helical gear.

10. The gimbal system of any of paragraphs 1 to 9, wherein each bar assembly includes an arm projecting transversely to the axis of rotation of such bar assembly and providing teeth of one of the gears.

11. The gimbal system of paragraph 10, wherein each bar assembly includes opposing end regions, and wherein at least one of the opposing end regions of each bar assembly includes the arm and also includes an attachment site for a linkage member.

12. The gimbal system of paragraph 11, wherein the attachment site is formed by a region of the bar assembly that is not part of the arm.

13. The gimbal system of paragraph 12, wherein the arm is a first arm, and wherein the region is a second arm.

14. The gimbal system of paragraph 13, wherein the bar assembly includes a shaft, and wherein the first and second arms extend in at least generally opposite directions from the shaft.

15. The gimbal system of paragraph 10, wherein the attachment site is provided by the arm.

16. The gimbal system of any of paragraphs 1 to 15, wherein the mount assembly includes a plurality of spring elements configured to resiliently position the gimbal apparatus along the axis.

17. The gimbal system of any of paragraphs 1 to 16, further comprising a processor programmed to control motor-driven rotation of the gimbals based on signals from one or more gyroscopes.

18. The gimbal system of paragraph 17, wherein the processor is programmed to control motor-driven rotation of the gimbals based on signals from an inertial measurement unit.

19. The gimbal system of paragraph 17, wherein the one or more gyroscopes are included in the gimbal apparatus.

20. The gimbal system of paragraph 17, wherein the processor is included in the gimbal apparatus, the mount assembly, or both.

21. The gimbal system of any of paragraphs 1 to 20, further comprising a vehicle, wherein the mount assembly is attached to the vehicle via the second frame.

22. The gimbal system of paragraph 21, wherein the vehicle is an aircraft that includes an inertial measurement unit, further comprising a processor programmed to control motor-driven orientation of the gimbals based on signals from the inertial measurement unit.

23. The gimbal system of any of paragraphs 1 to 22, wherein the payload includes a camera.

24. The gimbal system of paragraph 23, wherein the camera detects infrared radiation.

25. The gimbal system of any of paragraphs 1 to 14 and 16 to 24, wherein each bar assembly includes a shaft and a transverse member secured to the shaft such that the shaft and the transverse member rotate as a unit, wherein the transverse member forms a first arm and a second arm extending from the shaft, wherein the first arm forms one of the gears and the second arm forms an attachment site for one of the linkage members.

26. A method of using the gimbal system of any of paragraphs 1 to 25, the method comprising: securing the second frame of the mount assembly to a vehicle; and orienting the payload by rotation of the gimbals as the vehicle conveys the gimbal apparatus.

27. The method of paragraph 26, wherein the vehicle is an aircraft.

28. The method of paragraph 26 or 27, wherein the gimbal system further comprises a processor and an inertial measurement unit, wherein the step of orienting is controlled by the processor based on signals from the inertial measurement unit.

29. A gimbal system, comprising: (A) a gimbal apparatus including a first frame, a plurality of gimbals, and a payload orientable with respect to the first frame about a plurality of orthogonal axes by processor-controlled, motor-driven rotation of the gimbals; and (B) a mount assembly including a second frame configured to be attached to a support platform, first and second bar assemblies supported by and pivotably connected to the second frame for rotation about respective axes and rotationally coupled to each other by a pair of meshed gears, a plurality of linkage members connecting opposing end regions of each of the bar assemblies to the first frame, such that coupled rotation of the first and second bar assemblies produces motion of the gimbal apparatus along an axis extending orthogonally through the second frame, and a plurality of spring elements disposed between the first and second frames and configured to resiliently position the gimbal apparatus along the axis.

30. The gimbal system of paragraph 29, wherein the first and second bar assemblies are rotationally coupled to each other by meshed engagement of a first pair of gears and meshed engagement of a second pair of gears.

31. The gimbal system of paragraph 29 or 30, wherein each gear is elongate orthogonal to an axis of rotation of such gear and includes a series of teeth arranged along an arcuate path that represents less than 45 degrees of a complete circle.

32. The gimbal system of any of paragraphs 29 to 31, wherein each gear is a helical gear.

33. The gimbal system of any of paragraphs 29 to 32, wherein each bar assembly includes a shaft and a transverse member secured to the shaft such that the shaft and the transverse member rotate as a unit, wherein the transverse member forms a first arm and a second arm extending from the shaft, wherein the first arm forms one of the gears and the second arm forms an attachment site for one of the linkage members.

34. A gimbal system, comprising: (A) a gimbal apparatus including a first frame, a plurality of gimbals, and a payload orientable with respect to the first frame about a plurality of orthogonal axes by processor-controlled, motor-driven rotation of the gimbals; and (B) a mount assembly including a second frame configured to be attached to a support platform, first and second bar assemblies pivotably connected to the second frame and each including a shaft and an arm extending transversely from the shaft, the shafts being rotationally coupled to each by toothed engagement of the arms with each other, a plurality of linkage members connecting the bar assemblies to the first frame, such that coupled rotation of the shafts produces motion of the gimbal apparatus along an axis, and a plurality of spring elements configured to resiliently position the gimbal apparatus along the axis.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

The invention claimed is:

1. A gimbal system, comprising:
a gimbal apparatus including a first frame and a plurality of gimbals supporting a payload that is orientable with respect to the first frame about a plurality of axes by motor-driven rotation of the gimbals; and a mount assembly including
- a second frame,
- first and second bar assemblies pivotably connected to the second frame for rotation about a pair of spaced axes and rotationally coupled to each other by a pair of gears, and
- a plurality of linkage members connecting the bar assemblies to the first frame, such that the first frame and the second frame remain parallel to each other as the first and second bar assemblies undergo coupled rotation.

2. The gimbal system of claim 1, wherein the first and second bar assemblies are rotationally coupled to each other by meshed engagement of a first pair of gears and meshed engagement of a second pair of gears.

3. The gimbal system of claim 1, wherein each gear is elongate orthogonal to an axis of rotation of such gear and includes a series of teeth arranged along an arcuate path that represents less than 45 degrees of a complete circle.

4. The gimbal system of claim 1, wherein each gear is a helical gear.

5. The gimbal system of claim 1, wherein each bar assembly includes a shaft and a transverse member secured to the shaft such that the shaft and the transverse member rotate as a unit, wherein the transverse member forms a first arm and a second arm extending from the shaft, wherein the first arm forms one of the gears and the second arm forms an attachment site for one of the linkage members.

6. The gimbal system of claim 1, wherein the mount assembly includes a plurality of spring elements configured to resiliently position the gimbal apparatus.

7. The gimbal system of claim 1, further comprising a processor programmed to control motor-driven rotation of the gimbals based on signals from one or more gyroscopes.

8. The gimbal system of claim 7, wherein the processor is programmed to control motor-driven rotation of the gimbals based on signals from an inertial measurement unit.

9. The gimbal system of claim 7, wherein the one or more gyroscopes are included in the gimbal apparatus.

10. The gimbal system of claim 7, wherein the processor is included in the gimbal apparatus, the mount assembly, or both.

11. The gimbal system of claim 1, wherein the payload includes a camera.

12. The gimbal system of claim 1, wherein the camera detects infrared radiation.

13. A gimbal system, comprising:
a gimbal apparatus including a first frame, a plurality of gimbals, and a payload orientable with respect to the first frame about a plurality of orthogonal axes by processor-controlled, motor-driven rotation of the gimbals; and a mount assembly including
- a second frame configured to be attached to a support platform,
- first and second bar assemblies supported by and pivotably connected to the second frame for rotation about respective axes and rotationally coupled to each other by a pair of meshed gears,
- a plurality of linkage members connecting opposing end regions of each of the bar assemblies to the first frame, such that the first frame and the second frame remain parallel to each other as the first and second bar assemblies undergo coupled rotation, and
- a plurality of spring elements disposed between the first and second frames and configured to resiliently position the gimbal apparatus.

14. The gimbal system of claim 13, wherein the first and second bar assemblies are rotationally coupled to each other by meshed engagement of a first pair of gears and meshed engagement of a second pair of gears.

15. The gimbal system of claim 13, wherein each gear is elongate orthogonal to an axis of rotation of such gear and includes a series of teeth arranged along an arcuate path that represents less than 45 degrees of a complete circle.

16. The gimbal system of claim 13, wherein each gear is a helical gear.

17. The gimbal system of claim 13, wherein each bar assembly includes a shaft and a transverse member secured to the shaft such that the shaft and the transverse member rotate as a unit, wherein the transverse member forms a first arm and a second arm extending from the shaft, wherein the first arm forms one of the gears and the second arm forms an attachment site for one of the linkage members.

18. A gimbal system, comprising:
a gimbal apparatus including a first frame, a plurality of gimbals, and a payload orientable with respect to the first frame about a plurality of orthogonal axes by processor-controlled, motor-driven rotation of the gimbals; and a mount assembly including
- a second frame configured to be attached to a support platform,
- first and second bar assemblies pivotably connected to the second frame and each including a shaft and an arm extending transversely from the shaft, the shafts being rotationally coupled to each by toothed engagement of the arms with each other;
- a plurality of linkage members connecting the bar assemblies to the first frame, such that the first frame and the second frame remain parallel to each other as the shafts undergo coupled rotation, and
- a plurality of spring elements configured to resiliently position the gimbal apparatus.

* * * * *